United States Patent [19]
Moen et al.

[11] 3,722,179
[45] Mar. 27, 1973

[54] LIFE SUPPORT PROCESS AND SYSTEM USING SOLVENT EXTRACTION

[75] Inventors: Walter B. Moen, Erie, Pa.; Albert Halfon, Niskayuna, N.Y.

[73] Assignee: Airco, Inc., Murry Hill, New Providence, N.J.

[22] Filed: Apr. 16, 1970

[21] Appl. No.: 29,218

[52] U.S. Cl. .............................. 55/40, 55/51, 55/68, 55/159
[51] Int. Cl. .................................... B01d 53/18
[58] Field of Search............55/38, 40, 46, 51, 68, 84, 55/159, 220; 23/309, 312 W; 128/140, 145, 147; 210/22

[56] References Cited
UNITED STATES PATENTS

| | | | |
|---|---|---|---|
| 3,308,063 | 3/1967 | Hess et al. | 23/312 W |
| 3,316,172 | 4/1967 | Hess | 23/312 W |
| 3,377,777 | 4/1968 | Isomura | 55/68 |

Primary Examiner—Charles N. Hart
Attorney—Edmund W. Bopp and H. Hume Mathews

[57] ABSTRACT

A life support system for an undersea habitat which derives oxygen directly from the sea without connection to shore or supply ships. Dissolved gases, including oxygen and nitrogen, are derived by liquid-to-liquid extraction from a stream of sea water. The gas-loaded solvent is first stripped of nitrogen, and then oxygen, in successive rectification processes, the oxygen passing into the habitat. Exhaust gas from the habitat is partially purified by passing it through fresh solvent, for absorption of carbon dioxide, after which it is recirculated in the habitat. The solvent, containing essentially nitrogen and carbon dioxide, is again contacted by gas-stripped sea water, which reabsorbs the carbon dioxide and nitrogen, and returns to the sea.

14 Claims, 5 Drawing Figures

LIFE SUPPORT PROCESS AND SYSTEM USING SOLVENT EXTRACTION

BACKGROUND OF THE INVENTION

This relates in general to techniques and equipment for supporting human life in an isolated, totally enclosed environment; and more particularly, to methods and apparatus for supplying life supporting gas to a deep sea habitat.

An application for patent entitled "Undersea Life Support System" is filed at even date herewith by Albert Halfon.

A variety of techniques for life support in an isolated closed environment have been developed in the prior art, for such applications as space crafts, submarines, and underwater habitats.

In the space craft applications, initial oxygen is usually supplied to the capsule from a cryogenic source. Exhaust carbon dioxide may be concentrated by absorption using, for example, lithium hydroxide, silica-gel, molecular sieves, or monoethanoline. Oxygen may be reclaimed from the desorbed carbon dioxide by first using hydrogen to convert it to methane and water, from which the product oxygen is obtained by electrolysis.

In submarines, oxygen has been conventionally supplied by first distilling sea water and electrolyzing the distilled water, returning the hydrogen to the sea. The exhaust carbon dioxide is conventionally disposed of by absorption in a molecular sieve or monoethanolamine, after which it is pumped back into the sea.

In underwater habitats of the type used in saturation diving programs, the oxygen is conventionally supplied from high pressure storage cylinders outside of the habitat, or by shore-based supplies through an umbilical-type hose. Carbon dioxide is conventionally removed by lime or lithium hydroxide absorption.

In accordance with two of the more recent methods of supply of oxygen and disposal of carbon dioxide to closed undersea environments, sea water is used as the working medium In one approach, stale air is pumped out of the undersea chamber through a venturi scrubber, subjecting the air to intimate contact with a fine spray of sea water, causing the oxygen dissolved in the sea water to diffuse into the oxygen-depleted air; and the carbon dioxide is absorbed by the sea water, the refreshed air being returned to the chamber. In another approach, semi-permeable membranes are used whereby oxygen and carbon dioxide are exchanged with sea water by selective diffusion through the membrane.

Each of the aforesaid systems has certain inherent difficulties which would prevent its adaptation to a large scale undersea installation of the type contemplated in connection with present invention. For example, the cryogenic storage of oxygen, and lithium hydroxide absorption of carbon dioxide, such as used in space capsules, would be impractical for undersea installations of the type contemplated by the present invention because of the logistics required for supply and storage. The production of oxygen by electrolysis of distilled water involves operational hazards at high pressures. Moreover, the pumping of carbon dioxide at high pressure into the sea would cause bubble formation, which is undesirable in applications where secrecy is desired. In accordance with the venturi scrubber technique, very large volumes of sea water must be handled to produce the desired supply.

Accordingly, a principal object of the present invention is improvement in techniques and equipment for supplying life supporting gas to and exhausting waste gas from a closed, isolated environment beneath the sea. A more particular object is to provide a life support system using highly developed commercial techniques which is peculiarly adapted to maintain a large scale manned undersea installation, at atmospheric pressure or above, without the usual umbilical connections to ship or shore, or tell-tale exhaust bubbles which might give rise to detection.

BRIEF DESCRIPTION OF THE INVENTION

These and other objects are realized in the system of the present invention in which oxygen is supplied to an undersea habitat, and metabolic carbon dioxide is eliminated therefrom using solvents to extract dissolved gases from the sea by liquid-to-liquid contact. More specifically, the present invention relies on the unique solubility characteristics of nitrogen, oxygen and carbon dioxide, in certain compounds, such as the fluorocarbons and silicones, which are immiscible with water.

In accordance with one embodiment, as a first step, sea water is contacted concurrently in a liquid-to-liquid extraction tower, in which a portion of the gases dissolved in the sea water are picked up by the solvent. The gas-loaded solvent then passes to a first rectifier tower where nitrogen is removed, leaving a residue of oxygen in the solvent, which then passes to a second rectifier tower where oxygen at a commercial grade of purity is separated out or stripped from the solvent and directed into the habitat. The solvent, stripped of oxygen and nitrogen, together with fresh solvent from a storage system, flows into a first absorbing tower where it functions in countercurrent with a stream of exhaust air from the habitat to remove metabolic carbon dioxide and various proportions of nitrogen and oxygen, depending on their solubility. The air stream, substantially purified of carbon dioxide, and including the unabsorbed gases, is returned to the habitat. The gas-loaded solvent, including nitrogen, oxygen and carbon dioxide, then passes to a third rectifier column, where it is stripped of high purity nitrogen; and to still an additional rectifier column, where substantially all the remaining oxygen is stripped away and directed into the habitat. Leaving the oxygen stripper, the stream of solvent containing only carbon dioxide passes into a second absorbing tower, where it reabsorbs the stream of high purity nitrogen returning from the nitrogen rectification column. The solvent stream from the second absorbing tower, containing essentially carbon dioxide and nitrogen, then passes into a second liquid-to-liquid extraction tower, where it is contacted concurrently with a stream or stripped sea water from the initial extraction tower, which stream reabsorbs the carbon dioxide and nitrogen and returns to the sea.

Within the contemplation of the invention are certain modifications in the adsorber circuit. For example, separate units may be used for respectively reabsorbing purified nitrogen and concentrating carbon dioxide in streams which are ultimately merged before contact with the sea water for reabsorption. Moreover, the solvent returning from contact with the sea water in the second extraction tower, after it has been stripped of absorbed gases, may be used to service the nitrogen rectifier towers in a parallel arrangement, rather than in succession, as previously described.

The principal advantages of the disclosed system of the present invention are:

1. It is substantially self-sufficient, requiring no connection to ship or shore, except possibly to a source of power;
2. It employs techniques which are highly developed commercially;
3. It substantially eliminates bubble production into the surrounding sea by emergent carbon dioxide, thereby removing the possibility of detection of the installation by bubble detecting sensors; and
4. It makes use of the unlimited supplies and sinks available in the open sea.

DETAILED DESCRIPTION OF THE DRAWINGS

Figure 1:
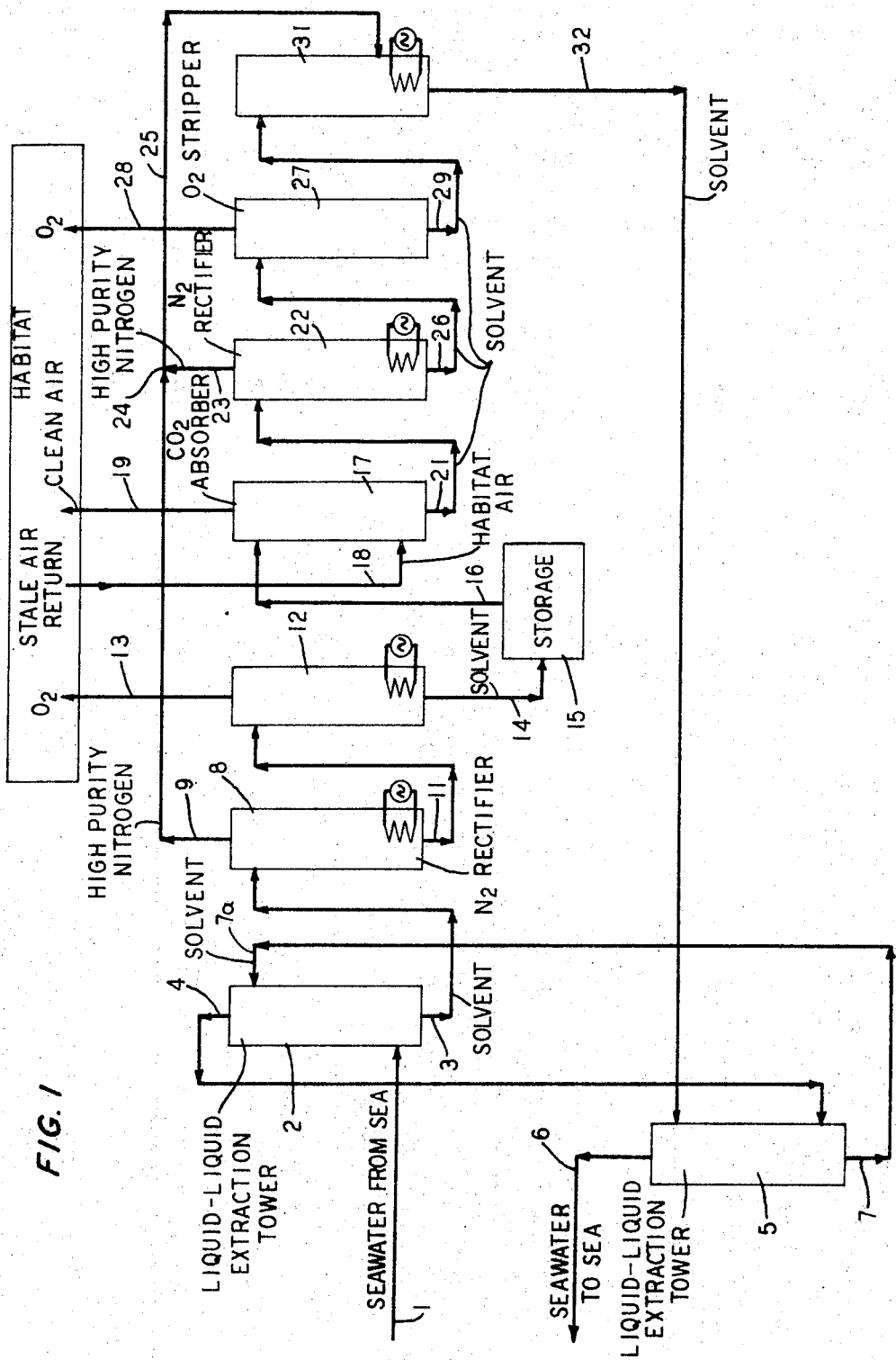
FIG. 1 is a schematic showing of a life support system using solvent extraction in accordance with the present invention.

Referring now to FIG. 1 of the drawings, there is shown the over-all flow diagram for a system in accordance with the present invention. The sea water from the deep sea, which is at an elevated pressure depending on the depth of the undersea installation under description, passes in through a conduit 1 to a first extraction tower 2. The latter contains a solvent which is adapted for a liquid-to-liquid extraction of the dissolved gases by counter-current contact with the sea water, including nitrogen, oxygen, and carbon dioxide. The solvent may be of any one of a number of types well-known in the art, which are immiscible with water, and have a substantially greater solubility for oxygen, and carbon dioxide than does sea water. Suitable, for example, are inert fluorochemical liquids manufactured by the Minnesota Mining & Manufacturing Company under the trade name "3M Brand FC–75" and "FC–43b". These are described in detail in a brochure of the Chemical Division of the 3M Company, copyright 1965, under the title "3M Brand Inert Fluorochemical Liquids". Pertinent data on these solvents is given in the introductory portion of the aforesaid brochure and also in the portion under Solubility. It will be noted that a solvent having no solubility for nitrogen would be ideal for the purposes of the present invention. Moreover, a solvent characterized by high oxygen solubility which greatly increased with temperature would also be ideal. Preferably, the carbon dioxide solubility in the solvent should be higher than that of oxygen, but not as temperature-dependent.

An inlet 7a into the upper end of extraction tower 2 provides a stream of solvent at a temperature, pressure, and flow rate to be described hereinafter, which makes liquid-to-liquid contact with the sea water flowing into the extraction tower at the lower end through the inlet conduit 1. Depending on the relative flow rates of the solvents and the solubilities of gases in the solvent and the sea water, respectively, a portion of the dissolved gases, oxygen, carbon dioxide, and nitrogen present in the sea water, is picked up by the solvent. The gas-loaded solvent then passes out through the conduit 3 at the lower end of the extraction tower 2 and into the rectifier column 8. The latter, which is a conventional nitrogen rectifier column of a type well-known in the art, functions to strip a stream of high purity nitrogen from the gases dissolved in the solvent. The stream of high purity nitrogen passes out through the conduit 9 at the top of the rectifier column 8. At the bottom of rectifier column 8, the stream of solvent, stripped of nitrogen, passes out through conduit 11 and into a second rectifier column 12, which is of any of the types well-known in the art which function by a well-known process to strip oxygen from a solvent. A stream of oxygen, of commercial purity, flows out through conduit 13 at the top of column 12, passing into the Habitat. The solvent, stripped of oxygen and nitrogen, then passes out through a conduit 14 at its lower end, and into a tank 15 for storage, where it may be merged with supplies of fresh solvent.

A stream of solvent from the storage tank 15 passes out through the conduit 16 and into a carbon dioxide absorber vessel 17, wherein solvent flows in at one end, moving in countercurrent with a stream of exhaust air from the Habitat, which passes in through the intake pipe 18 at the other end. The gases contained in the exhaust stream, including about 1 percent carbon dioxide, 79 percent nitrogen, and 21 percent oxygen, and also trace amounts of hydrocarbons, are absorbed in the stream of solvent in column 17, in proportion to their respective solubilities.

The cleansed stream of air is returned to the Habitat through a conduit 19, at the top of absorber 17. The solvent, loaded with absorbed gases, including carbon dioxide, nitrogen, and oxygen, passes out from the bottom of absorber 17 through a conduit 21, and into another rectifier column 22, which is similar in form to rectifier column 8, which functions to strip a second stream of high purity nitrogen from the solvent. The high purity nitrogen stream passes out of the top of the rectifier column 22, and through the conduit 23, which leads into the junction 24, where it is joined by the stream of high purity nitrogen from the conduit 9 passing out of the top of the first rectifier column 8. The remaining solvent passes out of the bottom of the rectifier column 22 through a conduit 26, and into a third rectifier column 27, similar in form to the rectifier column 12, where essentially all of the remaining oxygen, which was absorbed in the stream as it passed through absorber column 17, is stripped out and returned to the Habitat in a stream of commercially pure oxygen, leaving only carbon dioxide present in the solvent.

The solvent containing carbon dioxide then passes out of the bottom of rectifier column 27 through the conduit 29, and into the absorber column 31. This column functions to bring the stream of solvent in contact with the stream of high purity nitrogen passing out of junction 24 through conduit 25, whereby the nitrogen is absorbed in the solvent. The latter solvent, now loaded with waste nitrogen and carbon dioxide, passes out through the conduit 32, returning to the extraction tower 5, which functions in a reverse manner to the extraction tower 2, at the input end of the system. Here, liquid-to liquid contact again occurs between the stream of sea water, passing in through conduit 4, which has been stripped of the dissolved gases in extraction column 2, and the gas loaded solvent passing in through conduit 32, whereby the sea water reabsorbs the waste gases from the solvent stream. The sea water then passes out through the conduit 6 and is returned to the sea. The solvent, stripped of the absorbed gases, then returns through the conduit 7, passing through 7a into the initial liquid-to-liquid extraction tower 2.

The temperatures, pressures and flow rates at which the various operations occur are dependent, in each case, upon the quantity of gas dissolved in the sea water at the particular use location, upon the solvent used, and the pressure maintained in the Habitat, which in general will probably be atmospheric pressure, but which may be hyperbaric for certain applications. In addition to carbon dioxide, it is noted that hydrocarbons contained in the habitat atmosphere are also absorbed in the solvent, thereby maintaining breathing atmosphere essentially free from contaminants.

Figure 2:
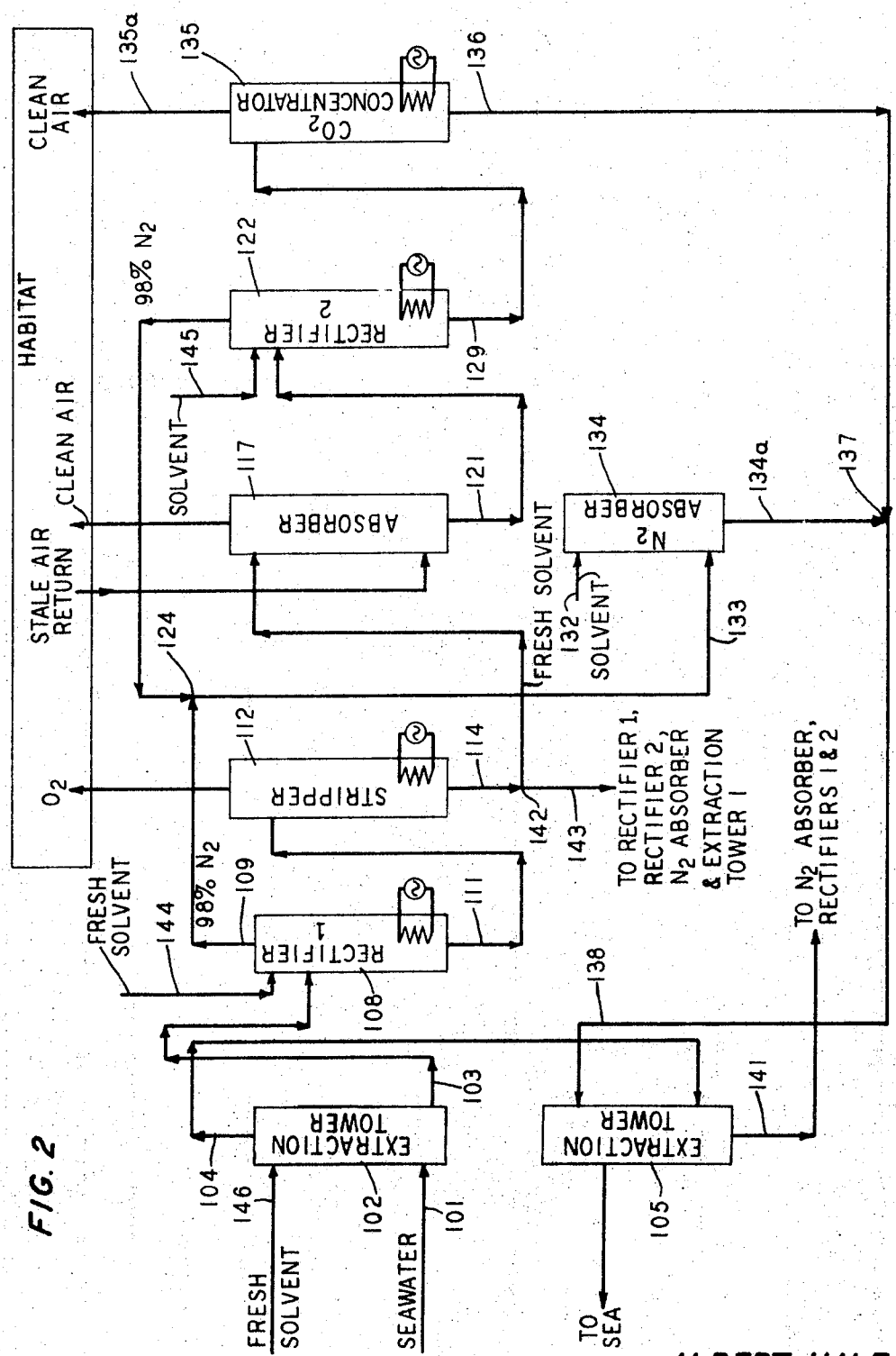
FIG. 2 is a schematic showing of a modification of the life support system of FIG. 1, including an alternative solvent circuit.

Referring, now, to FIG. 2 of the drawings, there is shown a modification of the system described with reference to FIG. 1, in which the principal difference from that system is in the circuit traversed by the solvent.

It will be noted that the elements of the system of FIG. 2 are designated by numbers preceded by one hundred, whereas the elements in the system of FIG. 1 are designated by tens and units. Where the tens and units designations are similar in the two figures, the elements are substantially similar. Thus, the extraction tower 102 in FIG. 2 is substantially similar to extraction tower 2 in FIG. 1.

In FIG. 2, solvent from the second extraction tower 105, from which all of the dissolved gases have been stripped away by the sea water, instead of returning to the first extraction tower, as in the previous figure, passes out through conduit 141. From there, it is directed through parallel paths, one such path directing fresh solvent into the nitrogen rectifier tower 108 through inlet 144; a second such path directing fresh solvent into the nitrogen rectifier 122 through input conduit 145, and a third to nitrogen absorber 134 through input conduit 132. In addition, solvent flowing out of the rectifier 112, through conduit 114 in the bottom, which has been stripped of oxygen, also passes through junction 142, from which it may be directed in parallel paths into nitrogen rectifier 108 through input conduit 144, nitrogen rectifier 122 through input conduit 145, nitrogen absorber 134 through input conduit 132, and in addition, back to the extraction tower 102 input through conduit 146.

It will be noted that nitrogen absorber 134, which receives the combined streams of nitrogen from junction 124 through conduit 133, is separate from the carbon dioxide concentrator 135. The latter receives the stream of solvent passing out of nitrogen rectifier 122 through conduit 129, from which nitrogen picked up from the exhaust air from the Habitat has been stripped. Carbon dioxide and oxygen are the principal dissolved gases in this stream which passes into the carbon dioxide concentrator 135. The carbon dioxide is stripped out by concentrator 135, the balance, principally oxygen, returning to the Habitat through conduit 135a. The solvent retaining concentrated carbon dioxide passes out through conduit 136 and into junction 137, where it is joined by solvent carrying waste nitrogen, passing down through conduit 134a. The combined streams of solvent then carry the waste gases through conduit 138 into the extraction tower 105, where they are picked up by the sea water for return to the sea.

In addition to the channels shown on the flow diagrams of FIGS. 1 and 2 of the drawings, it is contemplated that other alternate arrangements may be used, including side streams for purifying the solvent, and for making up the solvent. Inasmuch as it is anticipated that these will be carried out in a conventional manner, they are therefore not shown.

Figure 4:
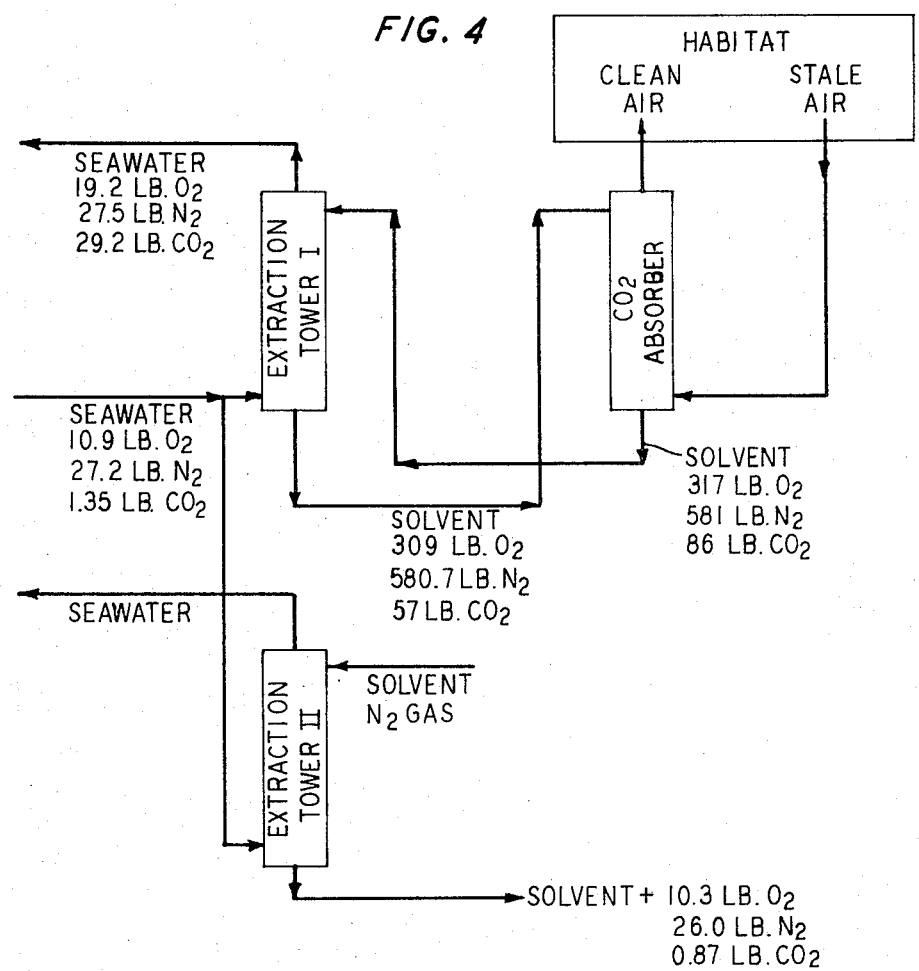
FIG. 4 is a schematic showing the gas concentration in the streams leading into and out of the input extraction tower, the carbon dioxide absorber and the output extraction tower of a theoretical circuit in accordance with the present invention.

A specific numerical example based on the crude schematic shown in FIG. 4 will now be computed for purposes of illustrating how such calculations can be made. It is based on the following known data:

TABLE I (Data from *The Oceans*, Their Physics, Chemistry, and Biology, by Sverdrup, John & Fleming, published by Prentiss Hall, 1942, at page 188).

Saturation in Sea Water at 20° Centigrade

| Solute | Milliliters per liter | Grams per liter |
|---|---|---|
| oxygen | 0.0–85 | 0–0.113 |
| nitrogen | 8.4–14.5 | 0.0098–0.01681 |
| carbon dioxide | 34.0–56.0 | 0.0624–0.103 |
| argon | 0.2–0.4 | 0.0033–0.0066 |

TABLE II (Data from page 191, *The Oceans*, supra) Temperature = 12° C. (54° F.); Chlorinity = 20 percent; and 1 atmosphere pressure:

Solvents

| Solute | Sea Water | FC–43 | FC–75 |
|---|---|---|---|
| | (Solubility in grams solute per 1000 grams solvent) | | |
| oxygen | 0.0386 | 0.253 | 0.62 |
| nitrogen | 0.0128 | 0.14 | 0.27 |
| carbon dioxide | 1.737 | 1.58 | 3.20 | where FC–43 and FC–75 are tradenames of the Chemical Division of 3M Manufacturing Company to designate inert fluorochemical liquids having boiling points at 345° F. and 216° F., respectively, pour points of −58° F. and −135° F., respectively, and respective densities of 117 and 110 pounds per cubic feet at 77° F. Other pertinent information about these solvents is given in the sections entitled "Solubility" of a booklet entitled *Technical Information*, 3M Brand Inert Fluorochemical Liquids, copyright 1965, by the Minnesota Mining and Manufacturing Company, St. Paul, Minn.

The following basic assumptions are made for the specific example about to be given:

1. That the sea water is 50 percent saturated with oxygen, and 100 percent saturated with nitrogen and carbon dioxide, respectively;
2. That the habitat atmosphere is composed approximately of 19 percent oxygen, 80 percent nitrogen, and 1 percent carbon dioxide;
3. That the cubic content of the habitat is designed to accommodate human beings, who will consume 100 pounds per hour of oxygen and will produce carbon dioxide at a rate of 86 pounds per hour; and
4. That the temperature of the sea water is 54° F. at the depth selected for the specific Habitat under description.

Further, assuming that sufficient commercial solvent is used, based on the values given in Table II, to strip from the sea water the entire amount of solute gas, the ratios of commercial solvent to sea water will be as indicated in the following table:

TABLE III

Ratios of Required Commercial Solvent (FC–43) to Sea Water

| For Solute | Solvent (Table II) Sea Water | Ratio |
|---|---|---|
| oxygen | 0.253/0.0386 | 6.56 |
| nitrogen | 0.14/0.0313 | 10.8 |
| carbon dioxide | 1.58/1.74 | 0.91 |

Let us now compute the number of pounds of solute dissolved in one million pounds of sea water for each of the gases, oxygen, nitrogen, and carbon dioxide, using the values given in Table III above, and assuming air initially in contact with the sea water to contain approximately 21 percent by weight of oxygen, 79 percent by weight of nitrogen, and 0.03 percent by weight of carbon dioxide:

TABLE IV

| Solute | Percent saturation | Grams solute/ 1,000 grams sea water | Pounds solute/ million pounds sea water |
|---|---|---|---|
| Oxygen | 50 | $\frac{0.0386 \times .21}{2}$ | 4.05 |
| Nitrogen | 100 | $\frac{0.0128 \times .79}{1}$ | 10.1 |
| Carbon dioxide | 100 | $\frac{1.737 \times .0003}{1}$ | 0.5 |

Figure 3:
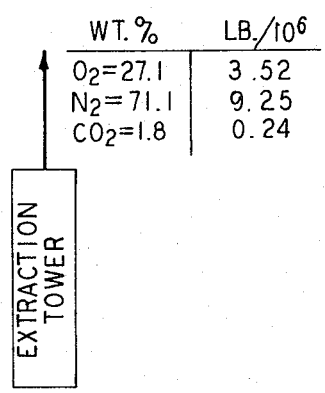
FIG. 3 is a diagram showing the gas concentration in the solvent leaving the seawater-solvent extraction tower, and leaving the carbon dioxide absorber.
Figure 5:
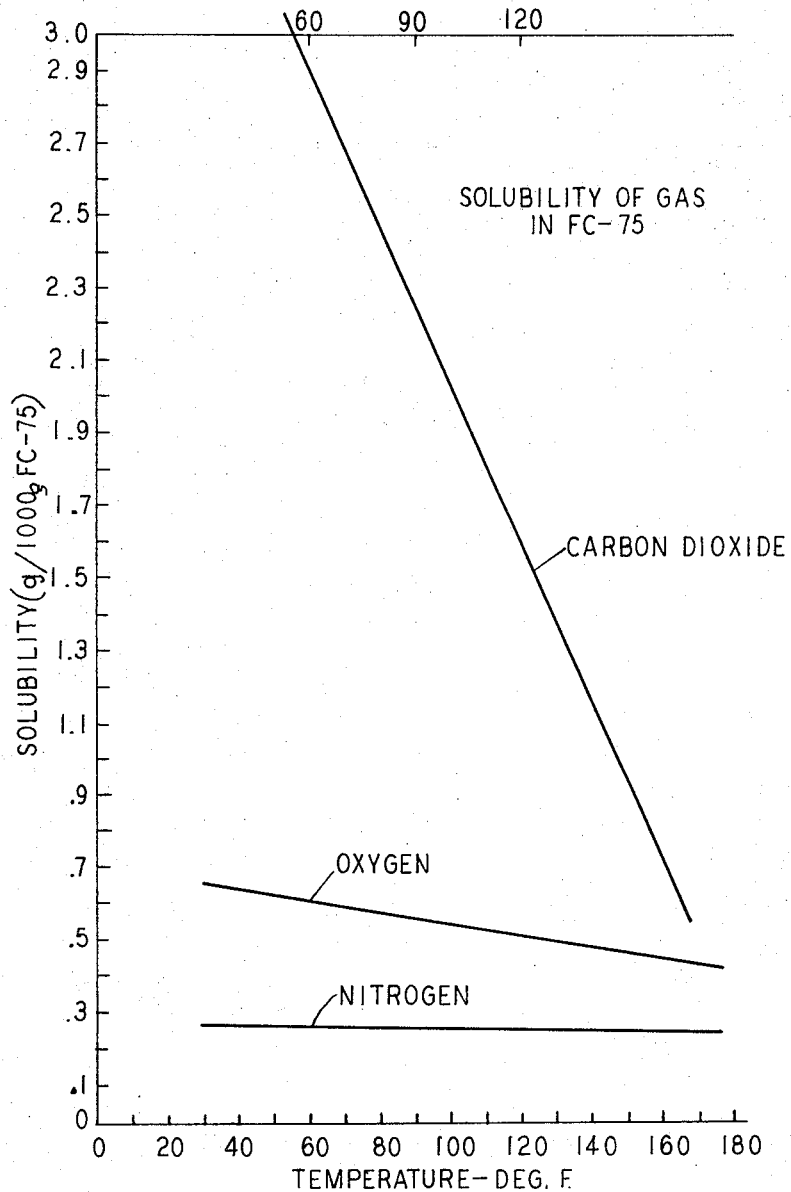
FIG. 5 is a plot in which solubility in grams of solute per thousand grams of solvent (FC–75) is plotted against temperature in degrees Fahrenheit for carbon dioxide, oxygen, and nitrogen.

Referring to FIG. 3 of the drawings, the action taking place in carbon dioxide absorbing tower 17, (FIG. 1) will be considered quantitatively, assuming the use of FC–43 solvent, and an 80 percent approach to an equilibrium condition between solvent and solute, at 54°F., the temperature of sea water at the selected level.

TABLE V

Solvent FC–43

| | Gas solute derived from habitat exhaust | | |
|---|---|---|---|
| Gas solute | Percent gas in habitat exhaust | Solute per 1,000 g. sea water solvent (Table II) | Pounds gas per pound solvent |
| Oxygen | 19 | 0.253 | $\frac{0.19 \times 0.253 \times 0.8}{1,000} = \frac{38.4}{10^6}$ |
| Nitrogen | 80 | 0.14 | $\frac{0.80 \times 0.14 \times 0.8}{1,000} = \frac{89.5}{10^6}$ |
| Carbon dioxide | 1 | 1.58 | $\frac{0.01 \times 1.58 \times 0.8}{1,000} = \frac{12.65}{6}$ |

TABLE VI

Leaving CO₂ Absorber Gas Concentration in One Million Pounds of Solvent (FC–43) (See Table V)

| Gas Solute | From Table V (lb. solute/million lbs. solvent | Weight % |
|---|---|---|
| oxygen | 38.4 | 27.4 |
| nitrogen | 89.5 | 63.6 |
| carbon dioxide | 12.62 | 9.00 |
| totals | 140.55 | 100.00 |

Operation of the sea water-solvent extraction tower II at the output end of the system, will now be analyzed, with the assumption that the solvent is completely stripped of all gas by the seawater, at a flow rate of one pound of solvent per one pound of sea water:

TABLE VII

| | Gas solute dissolved in sea water from commercial solvent (FC–43) at contactor tower 5 | | |
|---|---|---|---|
| Gas solute | Solubility ratio: solvent/ sea water (Table III) | Exhaust-gas content per pound solvent (Table IV) | Pounds gas per pound solvent |
| Oxygen | 6.56 | 4.05 | $\frac{6.56}{1+6.56} \times 4.05 = \frac{3.52}{10^6}$ |
| Nitrogen | 10.8 | 10.1 | $\frac{10.8}{1+10.8} \times 10.1 = \frac{9.25}{10^6}$ |
| Carbon dioxide | 0.91 | 0.5 | $\frac{0.91}{1+0.91} \times 0.5 = \frac{0.238}{10^6}$ |

TABLE VIII

Gas Concentration in Solvent (FC–43) at Extraction Tower II

From Table VII

| Gas Solute | Lb. Solute per Million Lb. Solvent | Weight % |
|---|---|---|
| oxygen | 3.52 | 27.1 |

| | | |
|---|---|---|
| nitrogen | 9.25 | 71.1 |
| carbon dioxide | 0.238 | 1.8 |
| totals | 13.008 | 100.0 |

Another example will now be computed, using a different solvent, namely FC-75, at a different temperature, 60° F., assuming the solubility of air in the solvent to be 0.34 grams/1,000 grams of solvent; and the solubility of nitrogen in the solvent to be 0.268 grams/1,000 grams of solvent. Therefore, nitrogen content in air is 79 percent; and the equivalent solubility of nitrogen is $0.268 \times 0.79 = 0.212$ grams nitrogen per 1,000 grams of solvent.

Oxygen content in air is 21 percent. If the solubility of air is 0.340 grams per 1,000 grams of solvent, subtracting the solubility of nitrogen, then $0.340 - 0.212 = 0.128$ grams per 1,000 grams of solvent. Therefore, the solubility of oxygen is $0.128/0.29 = 0.61$ grams per 1,000 grams solvent, at 1 atmosphere pressure.

Taking another example, using FC-75 solvent, at 150° F., the solubility of air is 0.30 grams per 1,000 grams of solvent; therefore, the solubility of nitrogen is 0.255 grams per 1,000 grams of solvent. Nitrogen content in air is 79 percent and equivalent solubility of nitrogen is $0.255 \times 0.79 = 0.202$ grams nitrogen per 1,000 grams of solvent. The solubility of oxygen is $$(0.300 - 0.202)/0.21 = 0.098/0.21 = 0.467 \text{ grams}$$
oxygen per 1,000 grams solvent, at 1 atmosphere pressure.

As to carbon dioxide, assuming that the solubility ratio of carbon dioxide to nitrogen in FC-75 equals that in FC-43:

TABLE IX

| Temp. | Grams Solute/1000 Grams Solvent |
|---|---|
| At 60°F. | FC-43 = $(1/0.14 N_2)/(1.52 CO_2) = 10.85$ |
| | FC-75 = $10.85 \times 26.8 = 2.91$ |
| At 90°F. | FC-43 = $(1/0.14 N_2)/(1.2 CO_2) = 8.57$ |
| | FC-75 = $8.57 \times 0.262 = 2.25$ |

TABLE X

Ratios of Required Commercial Solvent (FC-75) to Sea Water (at temperature = 54° F.)

| For Solute | Solvent/Sea Water (Table II) | Ratio |
|---|---|---|
| Oxygen | 0.62/0.0386 | |
| | 0.27/0.128 | 21.1 |
| | 3.20/1.737 | 1.84 |

As in the previous example, the action taking place at the carbon dioxide absorber tower will be considered quantitatively, assuming the use of FC-75 solvent, at 54° F. and assuming the liquid solvent to be free of gas, and further, assuming a 100 percent approach to equilibrium condition between solvent and solute.

The partial pressure of carbon dioxide will be assumed to equal 0.01 atmosphere. Therefore, computing the amount of solvent for each of the gases in the $CO_2$ absorber:

TABLE XI $$86 \text{ lbs. } CO_2 \times \frac{1000 \text{ lbs. solvent}}{3.2 \text{ lbs. } CO_2} \times \frac{1}{0.01 \text{ atmosphere}/1 \text{ atmosphere}}$$

$$= 2,690,000 \text{ lbs. solvent.}$$

Nitrogen content =

$$2,690,000 \times 0.27/1000 \times 0.80 = 581 \text{ lbs.}$$

Oxygen content =

$$2,690,000 \times 0.62/1000 \times 0.19 = 317 \text{ lbs.}$$

TABLE XII (Solvent FC-75)

| Gas | Content in Pounds | Weight % |
|---|---|---|
| carbon dioxide | 86 | 8.8 |
| oxygen | 317 | 32.3 |
| nitrogen | 581 | 58.9 |
| totals | 984 | 100.0 |

TABLE XIII

| | Gas content of sea water | For |
|---|---|---|
| Solute Gas | per million pounds sea water | 2,690,000 Pounds Sea Water |
| oxygen | 4.05 lbs. | 10.9 lbs. |
| nitrogen | 10.1 lbs. | 27.2 lbs. |
| carbon dioxide | 0.5 lb. | 1.35 lbs. |

If fresh sea water and solvent from the carbon dioxide absorber are contacted:

TABLE XIV

| Available Gas | Pounds |
|---|---|
| oxygen | 10.9 + 317 = 328 |
| nitrogen | 27.2 + 581 = 608 |
| carbon dioxide | 1.35 + 86 = 87. |

After contact, assuming 100 percent equilibrium, then the gas contained in the sea water will be:

TABLE XV

| Absorbed Gas | Pounds | Picked-up gas by sea water |
|---|---|---|
| oxygen | 1/17.1×328=19.2 | 8.3 lbs. |
| nitrogen | 1/22.1×688=27.5 | 0.3 lb. |
| carbon dioxide | 1/2.84×87=30.6 | 2.92 lbs. |

OXYGEN STRIPPING

Using 2,690,000 lbs. of sea water and solvent, the available gas in the sea water (from Table XIII) is:
Oxygen = 10.9 lbs.
Nitrogen = 27.2 lbs.
Carbon Dioxide = 1.35 lbs.

The gas contained in sea water after contact with solvent is:

TABLE XVI

| Gas | Pounds | Picked-up by solvent |
|---|---|---|
| oxygen | 1/17.1×10.9=0.6 | 10.3 lbs. |
| nitrogen | 1/22.1×27.2=1.2 | 26.0 lbs. |
| carbon dioxide | 1/2.84×1.85=0.48 | 0.87 lb. |

Referring to FIG. 4, there is shown in schematic, the amounts of oxygen, nitrogen, and carbon dioxide, into the input and output extraction towers, I and II, and carbon dioxide absorber, assuming all sea water and carbon dioxide flow rates to be 2,690,000 pounds in each tower, and temperature = 54° F.

For a system in which the oxygen requirement is 100 pounds supply, and the carbon dioxide requirement is 76 pounds elimination:

Carbon dioxide elimination requires:

$$10/27.8 \times 2,690,000 = 8,320,000 \text{ lbs. solvent}$$

Oxygen loss is:

$$8,320,000/2,690,000 \times 8.3 = 31 \text{ lbs.}$$

Nitrogen loss is:

$$8,320,000/2,690,000 \times 0.3 = 0.93 \text{ lb.}$$

Oxygen supply is:

$$(100 + 31)/10.3 \times 2,690,000 = 34,200,000 \text{ lbs. solvent}$$

Nitrogen pick-up is:

$$34,200,000/2,690,000 \times 26.0 = 330 \text{ lbs.}$$

Carbon dioxide pick-up =

$$34,200,000/2,690,000 \times 0.9 = 10 \text{ lbs.}$$

Therefore, the net loss or gain for system will be:
Oxygen = 100 lbs. net gain;
Carbon dioxide = 76 lbs. net loss; and
Nitrogen about 330 lbs. net gain.

It will be understood, however, that the crude system shown in FIG. 4, which is merely for the purpose of demonstrating, in general, the method of making calculations for such systems as disclosed herein, would only be operative for a limited period because of nitrogen build-up in the system. This problem is substantially solved in the more complex systems shown and described with reference to FIGS. 1 and 2.

It will be apparent that the systems disclosed herein are merely representative, as the details of each of the systems employed and the parameters of the environment, such as temperature, pressure, volume, etc. For example, a plurality of solvents might function better than a single solvent, for the purpose of the present invention.

The present invention is not limited to the specific system combinations or chemical solvents disclosed herein by way of illustration. Moreover, the scope of this invention to be construed only in accordance with the appended claims.

We claim:

1. A system for supplying life supporting gas including oxygen to an isolated undersea habitat and purifying the habitat atmosphere to prevent undesired buildup of carbon dioxide which comprises in combination, means for processing a stream of sea water in countercurrent contact with a stream of liquid solvent having a greater solubility for oxygen than does sea water, for recovering from said stream of sea water at least part of the oxygen dissolved therein, means for separating out from said stream of solvent a supply of life supporting oxygen and directing said supply into said habitat, means for purifying the habitat atmosphere by dissolving carbon dioxide gas from said atmosphere in a stream of solvent, and means for contacting said last mentioned stream of solvent with a stream of sea water for absorption of said carbon dioxide for return to the sea.

2. An undersea system for supplying life supporting fluids including oxygen to a habitat beneath the sea and eliminating metabolic carbon dioxide from said habitat which comprises in combination: means for deriving a stream of sea water from the sea surrounding said habitat, a first liquid-to-liquid extraction tower comprising a solvent having a solubility for gases, including oxygen, carbon dioxide, and nitrogen, which exceeds that of sea water, whereby the major portion of the gases dissolved in said sea water is stripped from said sea water and dissolved in said solvent, a second liquid-to-liquid extraction tower, means for removing the stripped sea water from said first extraction tower and introducing said stripped sea water into said second liquid-to-liquid extraction tower, first rectification means connected to said first liquid extraction tower for receiving a stream of solvent containing said dissolved gases for stripping high purity nitrogen from said solvent, additional rectification means connected to receive the solvent stripped of nitrogen from said first rectification means for stripping oxygen from said solvent, means for delivering oxygen from said additional rectification means into said habitat, a storage means for receiving solvent stripped of oxygen and nitrogen from said additional rectification means, carbon dioxide absorbing means connected to receive purified solvent from said storage means, means for delivering air exhausted from said habitat to said carbon dioxide absorbing means for purging said air of impurities including carbon dioxide, and for returning said purged air to said habitat, additional absorbing means connected to said carbon dioxide absorbing means and said first rectification means for receiving solvent from said carbon dioxide absorbing means and for absorbing the stripped nitrogen in said solvent and returning said solvent to said second liquid-to-liquid extraction tower for contact with said stripped sea water, and means for returning said sea water from said second liquid-to-liquid extraction tower to the sea.

3. An undersea system for supplying life supporting gas to a habitat in accordance with claim 2, wherein said first rectification means includes a first rectifier column connected to said first liquid extraction tower to receive a stream of solvent containing said dissolved gases for separating out a first stream of high purity nitrogen from said solvent, said additional rectification means including a second rectifier column connected to said first rectifier column to receive a stream of solvent stripped of nitrogen therefrom and to strip from said last-named stream of solvent a first stream of commercially pure oxygen, said storage means being connected to receive the stripped solvent from said second rectifier column, said carbon dioxide absorbing means being connected to receive solvent from said storage means and a stream of exhaust air from said habitat, and to return said stream of air to said habitat substantially purged of carbon dioxide, a third rectifier column connected to said carbon dioxide absorbing means for receiving a stream of solvent containing carbon dioxide from the exhaust air from said habitat and for stripping a second stream of high purity nitrogen stream from said stream for combination with said first high purity nitrogen stream from said first rectifier column, a fourth rectifier column, connected to receive a stream of solvent from said third rectifier column stripped of nitrogen, for stripping a second stream of high purity oxygen from said solvent and delivering said oxygen stream to said habitat, a second absorbing means, connected to receive a stream of solvent from said fourth rectifier column, for receiving and absorbing the combined streams of high purity nitrogen derived from said second and fourth rectifier columns, means for delivering the solvent, including waste gases comprising carbon dioxide and said nitrogen, to said second liquid-to-liquid extraction tower, and means for delivering the sea water from said second liquid-to-liquid extraction tower to the sea and for returning the purified solvent to said first liquid-to-liquid extraction tower.

4. The combination in accordance with claim 2, wherein said first rectification means and additional rectification means include: a first rectifier column for separating out commercially pure nitrogen from a stream of solvent derived from said first liquid-to-liquid extraction tower, a second rectifier column connected to said first rectifier column for separating out commercially pure oxygen from a stream of solvent derived from said second rectifier column, said storage means connected to receive solvent from said second rectifier column stripped of nitrogen and oxygen, said carbon dioxide absorbing means connected to receive exhaust air from said habitat and to return air substantially purged of carbon dioxide to said habitat, a third rectifier column, connected to said carbon dioxide absorbing means, for receiving a stream of solvent containing absorbed waste gases including carbon dioxide from the exhaust air from said habitat and for stripping a second stream of high purity nitrogen from said column for combination with said first high purity nitrogen stream from said first rectifier column, a fourth rectifier column, connected to receive a stream of solvent from said third rectifier column stripped of nitrogen and containing waste gases including carbon dioxide, for stripping a second stream of oxygen from said solvent and delivering said oxygen stream to said habitat, means for returning a stream of said solvent including waste gas comprising carbon dioxide to a junction, a nitrogen absorbing vessel, means for deriving solvent from said second rectifier column and directing said solvent to said nitrogen absorber and said first and third rectifiers in parallel, and means for directing the combined nitrogen streams to the nitrogen absorbing vessel, means for directing the solvent output of said nitrogen absorbing vessel to said junction and returning the combined solvents to said second extraction tower.

5. The combination in accordance with claim 1, wherein said solvent comprises an inert liquid substantially immiscible with sea water and having a substantially higher solubility for oxygen and carbon dioxide than does sea water at temperatures within the range 50°F. to 90°F. and at pressures within the range 1 to 30 atmospheres.

6. The combination in accordance with claim 4, wherein said solvent comprises an inert fluorochemical liquid.

7. The process of supplying life supporting gas including oxygen to an extended undersea habitat and eliminating therefrom waste gas including metabolic carbon dioxide which comprises the steps of: processing a stream of sea water for recovering dissolved gases including oxygen from said sea water by a direct exchange with a stream of solvent, having a greater solubility for oxygen than does the sea water, separating out from the said stream of solvent a breathing stream comprising oxygen and directing said breathing stream into said habitat, removing a stream of waste gases including carbon dioxide from the gas in said habitat, returning said stream of waste gases including said carbon dioxide for absorption in a stream of said solvent, and contacting the stream of said solvent including the waste gases including carbon dioxide with a stream of sea water for return of the waste gases to the sea.

8. In an undersea system for supplying life supporting oxygen to a human habitat beneath the sea and eliminating metabolic carbon dioxide from said habitat which comprises in combination the steps of:
deriving a stream of sea water from the sea,
utilizing said stream for liquid-to-liquid extraction of the dissolved gases in said stream by a stream of solvent having a greater solubility for said gases than has said sea water,
stripping high purity nitrogen from a stream of solvent including said dissolved gases,
stripping oxygen from the stream of solvent including said dissolved gases and returning said solvent to storage,
passing said solvent through carbon dioxide absorbing means for absorbing waste gases including carbon dioxide from a stream of exhaust air returning from said habitat,
returning said stream of air cleansed of carbon dioxide to said habitat,
passing said solvent comprising absorbed waste gases including carbon dioxide through rectifying means for stripping from said solvent an additional stream of high purity nitrogen,
further stripping said stream containing absorbed carbon dioxide and stripped of nitrogen to means for further stripping oxygen from said stream for habitat,
returning said solvent stripped of oxygen and nitrogen and containing absorbed carbon dioxide for receiving said high purity nitrogen stripped from said solvent,
returning said stream including carbon dioxide and nitrogen for liquid-to-liquid extraction of said carbon dioxide and nitrogen from said solvent by sea water, and
returning the sea water, including dissolved carbon dioxide and nitrogen to the sea.

9. The process for supplying life supporting gas including oxygen to a habitat beneath the sea and eliminating metabolic carbon dioxide from said habitat which comprises in combination: deriving a stream of sea water from the sea surrounding said habitat, contacting a stream of solvent in a countercurrent liquid-to-liquid exchange for recovering dissolved gases including oxygen, carbon dioxide, and nitrogen from said sea water, directing the stripped stream of sea water from said first extraction process to a second extraction process, passing the stream of solvent including said recovered gases through a first rectification step for stripping from said solvent a stream of high purity nitrogen, directing said solvent including a balance of said recovered gases through additional rectification steps for stripping a stream of oxygen from said solvent, delivering said stream of oxygen into said habitat, storing the solvent from which said recovered gases have been stripped, directing a stream of said purified solvent into carbon dioxide absorbing means for a countercurrent exchange with a stream of exhaust air from said habitat for purging said air of impurities including carbon dioxide, returning said purged air to said habitat, directing the solvent including dissolved carbon dioxide and waste gases to receive a stream of nitrogen from said first rectification step for dissolving said nitrogen in said stream of solvent including carbon dioxide, and directing said last-named stream of solvent for countercurrent exchange with said stripped stream of sea water in said second extraction process for dissolving waste gases including said nitrogen and carbon dioxide in said stripped stream and returning the stream of sea water including said dissolved gases to the sea.

10. The method of operation in accordance with claim 9, wherein said rectification steps include:
 a first rectification step wherein high purity nitrogen is separated out from a stream of said solvent,
 a second rectification step deriving solvent from said first rectification step and separating out a stream of high purity oxygen from said solvent, and directing said high purity oxygen into said habitat,
 the stripped solvent from said second rectification step passing to storage means,
 said solvent being directed from said storage means to a carbon dioxide absorbing step wherein a stream of exhaust air from said habitat is passed in countercurrent with said solvent for absorbing therefrom waste gas including carbon dioxide, the purged air being returned to said habitat,
 a third rectification step for receiving solvent from said carbon dioxide absorbing step comprising dissolved gases including oxygen, nitrogen, and carbon dioxide for separating out a second stream of high purity nitrogen from said solvent for combination with the first high purity nitrogen stream from said first rectification step,
 a fourth rectification step for receiving the stream of solvent from said third rectification step for stripping a second stream of high purity oxygen from said solvent and delivering said oxygen stream to said habitat,
 an additional absorbing step connected to receive a stream from said fourth rectification step containing concentrated waste gases comprising carbon dioxide for receiving and absorbing the combined streams of high purity nitrogen derived from said first and third rectification steps,
 delivering a stream of the said solvent including said waste gases comprising carbon dioxide and said nitrogen to a final liquid-to-liquid extraction step wherein a stream of stripped sea water from said first liquid-to-liquid extraction step passes in countercurrent from said stream of solvent for redissolving in said sea water, said waste gases comprising carbon dioxide and nitrogen, for return to the sea.

11. The method in accordance with claim 7 wherein said solvent comprises an inert liquid substantially immiscible with sea water and having a substantially higher solubility for oxygen, than does sea water at temperatures within the range 50° F. to 90° F. and at pressures within the range 1 to 30 atmospheres.

12. The process of supplying a life supporting gas to an undersea environment comprising recovering dissolved oxygen from a stream of sea water by contacting said stream of sea water with a stream of solvent having a greater solubility for oxygen than does the sea water, stripping the oxygen from the solvent and directing the stripped oxygen to the undersea environment.

13. The process of claim 12 further including removing nitrogen from said environment in order to prevent undesired build-up of nitrogen in said environment.

14. The process of claim 12 further including removing carbon dioxide from said environment in order to prevent undesired buildup of the carbon dioxide in said environment.

* * * * *